Nov. 12, 1940. C. TRILLING 2,220,923

DRAFTING INSTRUMENT

Filed May 23, 1938

Inventor.
Charles Trilling

Patented Nov. 12, 1940

2,220,923

UNITED STATES PATENT OFFICE 2,220,923

DRAFTING INSTRUMENT

Charles Trilling, New York, N. Y.

Application May 23, 1938, Serial No. 209,565

2 Claims. (Cl. 33—191)

(Granted under the act of March 3, 1883, as amended April 30, 1928; 370 O. G. 757)

It is frequently desirable, as, for example, when plotting experimental points on a graph, to indicate the positions of certain points on a sheet of paper, tracing cloth, etc. It is customary to mark a designated point on the paper with a small symbol—such as a circle, square, triangle, cross, etc.—whose geometric center coincides with the designated point. (The term "circle" is used in a drafting sense rather than in a mathematical sense to denote a blackened annular area; a similar remark applied to the other symbols). The symbols are often made freehand. In more precise work they are made with compass and straight edge, and when many points are to be marked, a large amount of tedius drafting is involved.

It is an object of my invention to provide a drafting instrument with which one can mark a designated point on paper with any desired symbol, an instrument the use of which is more accurate than freehand drafting and more expedient than ordinary drafting instruments as the compass and straight edge.

In the drawing.

In the drawing like numerals indicate like parts.

Figure 1:
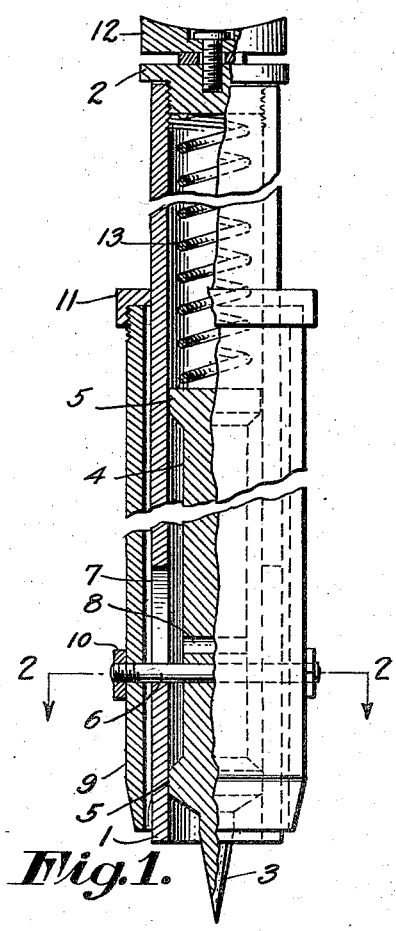
Fig. 1 is an elevation of the instrument, partially sectioned through an axial (vertical) plane.

The essential parts of the instrument are a marker and a centering device. The marker 1 comprises a circular hollow tube made of any suitable material. The tube is provided with a cover 2, of a screw-on type in the form shown.

The centering device comprises a rod or pointer 3, tapered at its lower end, and axially slidable within the marker. Guides are provided to keep the pointer properly centered with respect the marker. In the form shown the pointer is thinned in the central portion 4 and guided by the shoulders 5, 5.

Figure 3:
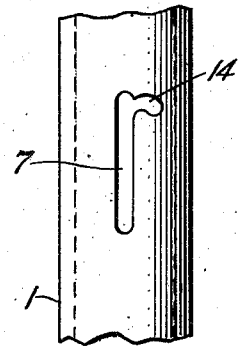
Fig. 3 is a side elevation of a small portion of the instrument.

The pointer 3 is provided with a horizontal diametral bore to receive a pin 6 extending out through two longitudinally disposed slots 7 in the walls of the marker 1. The ends of the slots serve as stops to limit the travel of the pointer, which in its normal position is at the lowest point of its travel with its tip projecting beyond the lower end of the marker. Means are provided to adjust the distance that the pointer so projects. In the form shown additional bores (not necessarily parallel to one another), such as the one designated by the numeral 8, are provided in the pointer 3. By inserting the pin 6 in a different bore the normal position of the pointer 3 can be altered. The instrument is provided with a casing 9, through an opening in which the pin 6 passes. The ends of the pin 6 are threaded to receive the nuts 10 which secure the pin 6 to the casing and thereby unite the casing and the pointer into an essentially single structure. A casing cover 11 is provided, an opening through which serves as a guide for the marker 1. A swivelling finger rest 12 is provided. A coil spring 13, compressed between the cover 2 and the upper end of the pointer 3, keeps the pointer projecting with respect to the marker. Means are provided for retaining the pointer in a retracted position. In the form shown and particularly illustrated in the side elevation, Fig. 3, short grooves or offsets 14 are provided at the upper ends of the slots 7. The marker 1 is depressed and twisted horizontally so that the pin 6 engages these groves in order to keep the pointer retracted.

In the operation of the instrument the lower or marking end of the marker 1 is coated with a marking fluid such as ink. This can be accomplished simply by pressing the tube on an inking pad or stamp pad. It is best to retract the pointer first and release it after inking. The tip of the pointer is then placed or literally stuck into a designated point on paper, and the marker is pressed on the paper, thereby marking on it a symbol whose shape is that of the cross-section of the tube—a circle.

Figure 4:
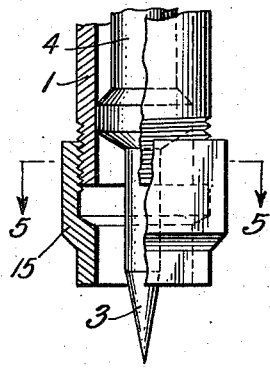
Figs. 4 and 5 are views identical to those in Figs. 1 and 2 respectively.
Figure 5:
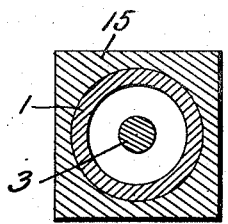

For simplicity the instrument was both described and illustrated for a marker in the form of a hollow circular tube, but, as illustrated in Figs. 4 and 5, this tube may be provided with a detachable marking tip of any shape whatever, without in any way affecting the operation of the instrument. The word "marker," then, may denote a tube with a separate, detachable marking tip. In the illustration, Figs. 4 and 5, the particular marking tip shown marks a designated point with a square and is attached to the circular tube 1 by a screw-on arrangement. As indicated, the pointer 3 must of course be longer to suit this construction.

Figure 6:
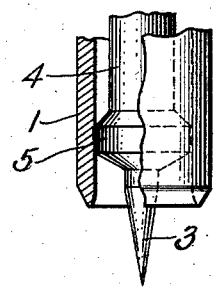
Fig. 6 is a view identical to that in Fig. 1, all showing modifications of the lower portion of the instrument.

As illustrated in Fig. 6, any marking tip may be bevelled or rounded off or shaped in any desired way.

Figure 7:
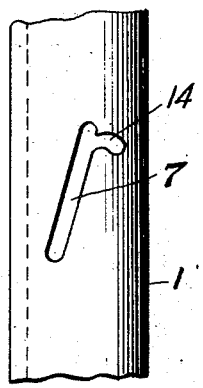
Fig. 7 is a side elevation of a small portion of a modified embodiment of the instrument.
Figure 2:
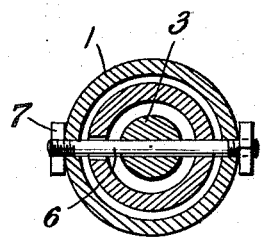
Fig. 2 is a bottom end view partially sectioned through the transverse plane 2—2 of Fig. 1.

For certain types of marking tips it may be preferable to make the slots 7 slightly spiral as illustrated in Fig. 7. Then the marker 1, which is guided by these slots, is forced to turn or twist with respect to the casing 9 in the operation of the instrument. In all other respects the operation of this embodiment and that of the basic design are the same.

This application is made under the act approved 3 March 1883, as amended by the act of 30 April 1928, and the invention herein described may be manufactured and used by or for the Government for governmental purposes without the payment to me of any royalty thereon.

I claim:

1. A drafting instrument for marking the position of a designated point on paper with a symbol, comprising a hollow tube, a marking tip fastened to one end of said tube, a pointed centering rod axially slidable in and guided by said tube, a transverse pin attached to said rod in an adjustable position, and extending through two longitudinal slots in said tube, a casing attached to said transverse pin and thus essentially immovable with respect to said pointed rod.

2. A drafting instrument for marking the position of a designated point on paper with a symbol, comprising a hollow tube, a marking tip fastened to one end of said tube, a pointed centering rod axially slidable in and guided by said tube, a transverse pin attached to said rod in an adjutsable position, and extending through two spiral slots in said tube, a casing attached to said transverse pin and thus essentially immovable with respect to said pointed rod.

CHARLES TRILLING.